(12) United States Patent
Karczewicz et al.

(10) Patent No.: US 8,995,526 B2
(45) Date of Patent: Mar. 31, 2015

(54) DIFFERENT WEIGHTS FOR UNI-DIRECTIONAL PREDICTION AND BI-DIRECTIONAL PREDICTION IN VIDEO CODING

(75) Inventors: Marta Karczewicz, San Diego, CA (US); Rahul P. Panchal, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 972 days.

(21) Appl. No.: 12/500,017

(22) Filed: Jul. 9, 2009

(65) Prior Publication Data
US 2011/0007803 A1 Jan. 13, 2011

(51) Int. Cl.
| | | |
|---|---|---|
| H04N 7/12 | (2006.01) | |
| H04N 11/02 | (2006.01) | |
| H04N 11/04 | (2006.01) | |
| H04N 19/137 | (2014.01) | |
| H04N 19/51 | (2014.01) | |
| H04N 19/19 | (2014.01) | |
| H04N 19/583 | (2014.01) | |

(Continued)

(52) U.S. Cl.
CPC ... *H04N 19/00145* (2013.01); *H04N 19/00715* (2013.01); *H04N 19/00351* (2013.01); *H04N 19/00733* (2013.01); *H04N 19/00024* (2013.01); *H04N 19/00266* (2013.01); *H04N 19/00175* (2013.01); *H04N 19/00781* (2013.01); *H04N 19/00721* (2013.01); *H04N 19/00545* (2013.01)
USPC .................................................. 375/240.15

(58) Field of Classification Search
CPC .................. H04N 19/00036; H04N 19/00272; H04N 19/00721
USPC ....................................................... 375/240.15
See application file for complete search history.

(56) References Cited

U.S. PATENT DOCUMENTS

| | | |
|---|---|---|
| 2004/0233995 A1 | 11/2004 | Abe et al. |
| 2005/0123274 A1 | 6/2005 | Crinon et al. |

(Continued)

FOREIGN PATENT DOCUMENTS

| | | |
|---|---|---|
| CN | 101208958 A | 6/2008 |
| JP | 2004538691 A | 12/2004 |

(Continued)

OTHER PUBLICATIONS

Richardson, Iaian; "H.264 and MPEG-4 Video Compression: Video Coding for Next-generation Multimedia"; Dec. 2003; John Wiley & Sons.*

(Continued)

*Primary Examiner* — Jeremaiah C Hallenbeck-Huber
(74) *Attorney, Agent, or Firm* — Todd E. Marlette

(57) ABSTRACT

In one aspect of this disclosure, techniques are described for the decoupling of uni-directional and bi-directional prediction weights, particularly for explicit weighted predictions of video blocks within a B-unit. According to this disclosure, explicit weights communicated in the bitstream may be applied by a decoder for explicit bi-directional prediction, but different weights (which may be default weights or separately defined explicit uni-directional weights) may be used for explicit uni-directional prediction. The described techniques may improve video quality relative to techniques that use the same explicit weights for explicit bi-directional prediction and explicit uni-directional prediction within a B-unit.

54 Claims, 6 Drawing Sheets

(51) Int. Cl.
| | |
|---|---|
| H04N 19/105 | (2014.01) |
| H04N 19/172 | (2014.01) |
| H04N 19/147 | (2014.01) |
| H04N 19/61 | (2014.01) |
| H04N 19/577 | (2014.01) |
| H04N 19/46 | (2014.01) |

(56) References Cited

U.S. PATENT DOCUMENTS

| | | | |
|---|---|---|---|
| 2005/0123374 | A1 | 6/2005 | Thorning |
| 2005/0259736 | A1 | 11/2005 | Payson |
| 2006/0093038 | A1* | 5/2006 | Boyce ...................... 375/240.16 |
| 2006/0146932 | A1 | 7/2006 | Panusopone et al. |
| 2006/0268166 | A1* | 11/2006 | Bossen et al. ............. 348/390.1 |
| 2006/0291557 | A1* | 12/2006 | Tourapis ................. 375/240.12 |
| 2006/0291562 | A1* | 12/2006 | Lee et al. ................ 375/240.16 |
| 2007/0223581 | A1 | 9/2007 | Iguchi |
| 2008/0089404 | A1* | 4/2008 | Okazaki et al. ............... 375/240 |
| 2008/0225946 | A1 | 9/2008 | Yin et al. |
| 2008/0253456 | A1* | 10/2008 | Yin et al. ................. 375/240.16 |
| 2009/0010330 | A1* | 1/2009 | Tourapis et al. ......... 375/240.12 |
| 2009/0087111 | A1 | 4/2009 | Noda et al. |
| 2009/0129474 | A1 | 5/2009 | Pandit et al. |
| 2009/0168886 | A1 | 7/2009 | Ikeda et al. |
| 2009/0279608 | A1 | 11/2009 | Jeon et al. |
| 2010/0086027 | A1 | 4/2010 | Panchal et al. |
| 2011/0007799 | A1 | 1/2011 | Karczewicz et al. |
| 2011/0007802 | A1 | 1/2011 | Karczewicz et al. |

FOREIGN PATENT DOCUMENTS

| | | | |
|---|---|---|---|
| JP | 2005533467 | A | 11/2005 |
| JP | 2006513592 | A | 4/2006 |
| JP | 2007019995 | A | 1/2007 |
| JP | 2007525072 | A | 8/2007 |
| JP | 2008541502 | A | 11/2008 |
| JP | 2008312266 | A | 12/2008 |
| JP | 2009512347 | A | 3/2009 |
| KR | 20070000022 | A | 1/2007 |
| WO | WO-03007119 | A2 | 1/2003 |
| WO | WO2004004310 | A2 | 1/2004 |
| WO | WO-2004008762 | A1 | 1/2004 |
| WO | WO-2005004492 | A2 | 1/2005 |
| WO | 2006128072 | A2 | 11/2006 |
| WO | WO-2007047271 | A2 | 4/2007 |
| WO | WO2007092215 | | 8/2007 |
| WO | WO2007092215 | A2 | 8/2007 |
| WO | WO-2007116551 | A1 | 10/2007 |
| WO | WO2008004940 | A1 | 1/2008 |
| WO | WO2009017301 | A1 | 2/2009 |
| WO | 2009054347 | A1 | 4/2009 |

OTHER PUBLICATIONS

Boyce: "Adaptive ref. picture weighting using ref. pic. index" Joint Video Team (JVT) of ISO/IEC MPEG & ITU-T VCEG(ISO/IEC JTC1/SC29/WG11 and ITU-T SG16 Q6), XX, XX, No. JVT-D122, Jul. 26, 2002, XP030005394 p. 11, line 12-line 21.

Ellinas J N et al: "Stereo video coding based on quad-tree decomposition of B-P frames by motion and disparity interpolation" IEE Proceedings: Vision, Image and Signal Processing, Institution of Electrical Engineers, GB LNKDDOI: 10.1049/IP-VIS:20045033, vol. 152, No. 5, Oct. 7, 2005, pp. 639-647, XP006024995 ISSN: 1350-245X p. 642, paragraph 3.2-p. 643.

International Search Report & Written Opinion—PCT/US2009/050332, International Search Authority—European Patent Office—Apr. 14, 2010.

Peng Yin et al: "Localized Weighted Prediction for Video Coding" IEEE,, May 23, 2005, pp. 4365-4368, XP010816640 ISBN: 978-0-7803-8834-5 the whole document.

Sullivan G J et al: "Video Compression-From Concepts to the H.264/AVC Standard" Proceedings of the IEEE, IEEE. New York, US LNKD-DOI:10.1109/JPROC.2004.839617, vol. 93, No. 1, Jan. 1, 2005, pp. 18-31, XP011123850 ISSN: 0018-9219 the whole document.

Tourapis et a: "H.264/MPEG-4 AVC Reference Software Enhancements" Internet Citation Jan. 17, 2005, XP002444400 Retrieved from the Internet: URL:ftp3.i tu.ch/av-arch/jvt-s i te/2005_01_HongKong/JVT-N014.doc> [retrieved on Jul. 26, 2007]p. 6-p. 9.

Information Technology—Coding of Audio-Visual Objects—Part 10: Advanced Video Coding, ISO/IEC 14496-10:2005.

Ye et al., "High Precision Interpolation and Prediction," VCEG-AI33, 35th Meeting in Berlin, Germany, Jul. 16-18, 2008.

Jill M. Boyce, "Weighted Prediction in the H.264/MPEG AVC Video Coding Standard." IEEE, 2004 (p. III-789-III-792).

Taiwan Search Report—TW098123558—TIPO—Oct. 26, 2012.

Bramer B., "Errors in numerical computation", Apr. 4, 2002, available at https://web.archive.org/web/20020404064343/http://www.cse.dmu.ac.uk/~bb/Teaching/ComputerSystems/ErrorsInComputation/ErrorsInComputation.htm.

Popyack J.L., "Rounding Error", Jun. 2000, available at https://www.cs.drexel.edu/~introcs/Fa03/extras/Rounding/index.html.

Kadono: "Implicit Weighted Bi-prediction using DC Offset" ITU Study Group 16—Video Coding Expert Group—ISO/IEC MPEG & ITU-T VCEG(ISO/IEC JTCI/SC29/WG11 and ITU-T SG16 Q6), XX , XX , No. JVT-E077, Oct. 18, 2002, XP030005494.

Kamp S, et al., "Error accumulation in motion comp i n P and B slices" 27. JVT Meeting; Jun. 4, 2008-Oct. 4, 2008; Geneva, (Joint Video Team of ISO/IEC JTCI/SC29/WG11 and ITU-T SG . 16), , Apr. 24, 2008, XP030007382.

QUALCOMM: "Switched Interpolation Filter with Offset" ITU-T SG16/Q.6 DOC. T05-SG-C 463-E, International Telecommunication Union, Geneva, CH, Apr. 14, 2008, pp. 1-4, XP007908845.

Bordes et al, "JCT-VC AHG Report: Weighted Prediction (AHG18)," 6th Meeting: Torino, IT, Jul. 14-22, 2011, JCTVC-F018, pp. 1-2.

Bordes, "Weighted Prediction," 5th Meeting: Geneva, CH, Mar. 16-23, 2011, JCTVC-E041r2, 9 pages.

Bordes, "Weighted Prediction," 6th Meeting: Torino, IT, Jul. 14-22, 2011, JCTVC-F265, pp. 1-14.

Bossen, "Common test conditions and software reference configurations," JCTVC-F900, ITU-T SG16 WP3 and ISO/IEC JTC1/SC29/WG11, 6th Meeting: Torino, IT, Jul. 14-22, 2011, 3 pages.

ITU VCEG, "Draft Requirements for next-generation video coding project" 38th Meeting: London, UK, Jul. 1-8, 2009, VCEG-A196, 4 pages.

ITU-T H.263, Series H: Transmission of Non-Telephone Signals, Video Coding for Low Bit Rate Communication, The International Telecommunication Union. Mar. 1996, 52 pages.

ITU-T H.264, Series H: Audiovisual and Multimedia Systems, Infrastructure of audiovisual services—Coding of moving video, Advanced video coding for generic audiovisual services, The International Telecommunication Union. Jan. 2012, 680 pages.

ITU-T H.264, Series H: Audiovisual and Multimedia Systems, Infrastructure of audiovisual services—Coding of moving video, Advanced video coding for generic audiovisual services, The International Telecommunication Union. May 2003, 282 pages.

ITU-T H.265: "High efficiency video coding International" Series H: Audiovisual and Multimedia Systems Infrastructure of audiovisual services—Coding of moving video, Apr. 2013, pp. 1-300.

Sullivan et al., "Meeting report of the fifth meeting of the Joint Collaborative Team on Video Coding (JCT-VC), Geneva, CH, Mar. 16-23, 2011," 5th Meeting: Geneva, CH, Mar. 16-23, 2011, JCTVC-E600v3, pp. 1-211.

Sullivan, et al., "Meeting report of the seventh meeting of the Joint Collaborative Team on Video Coding (JCT-VC), Geneva, CH, Nov. 21-30, 2011," Joint Collaborative Team on Video Coding (JCT-VC) of ITU-T SG16 WP3 and ISO/IEC JTC1/SC29/WG11 7th Meeting: Geneva, CH, Nov. 21-30, 2011, Document: JCTVC-G1100, 305 pages.

Sullivan et al., "Meeting report of the sixth meeting of the Joint Collaborative Team on Video Coding (JCT-VC), Torino, IT, Jul. 14-22, 2011," 6th Meeting: Torino, IT, Jul. 14-22, 2011, JCTVC-F800, pp. 1-257.

(56) References Cited

OTHER PUBLICATIONS

Sullivan et al., "Overview of the H.265/HEVC Video Coding Standard," IEEE Transactions on Circuits and Systems for Video Technology, vol. 22, No. 12, Dec. 2012, pp. 1649-1668.

Takamura et al., "Weighted Prediction with Parameter Estimation," 6th Meeting: Torino, IT, Jul. 14-22, 2011, JCTVCF397, pp. 1-3.

Tanizawa et al., "AHG18: Explicit Weighted Prediction with simple WP parameter estimation," 6th Meeting: Torino, IT, Jul. 14-22, 2011, JCTVC-F326, pp. 1-9.

Tanizawa et al., "Cross-Checking Reports of Improved Weighted Prediction," 7th Meeting: Geneva, CH, Nov. 21-30, 2011, JCTVC-G524, pp. 1-3.

Wiegand T et al., "Overview of the H.264/AVC Video Coding Standard", IEEE Transactions on Circuits and Systems for Video Technology, IEEE Service Center, Piscataway, NJ, US, vol. 13, No. 7, Jul. 1, 2003, pp. 560-576, XP011221093, ISSN: 1051-8215, DOI: DOI:10.1109/TCSVT.2003.815165.

Ye et al., "Improved Weighted Prediction," 7th Meeting: Geneva, CH, Nov. 21-30, 2011, JCTVC-G065, pp. 1-5.

Jeon B. M., et al., "B pictures in JVT", joint Video Team (JVT) of ISO/IEC MPEG & ITU-T VCEG (ISO/IEC JTC1/SC29/WG11 and ITU-T SG16 Q.6), 4th Meeting: Klagenfurt, Austria, Jul. 2002, JVT-D155, pp. 1-19.

Kikuchi: "Simplification of the Weighted Prediction & Verification Result", ITU SRJDY Group 16-Video Coding Experts Group—ISO/IEC MPEG & ITU-T VCEG(ISO/IEC JTC1/SC29/WG11 and ITU-T SG16 Q6), No. JVT-F077r1, Dec. 13, 2002.

Boyce J, "Adaptive Reference Picture Weighting Using Reference Picture Index," 4th Meeting: Klagenfurt, Austria, Jul. 22-26, 2002, JVT-D122, 7 Pages.

Boyce J, "Changes to Adaptive Reference Picture Weighting," 5th Meeting: Geneva, CH, Oct. 9-17, 2002, JVT-E060, 7 pages.

Boyce J. M, "Weighted Prediction in the H.264/MPEG AVC Video Coding Standard," Circuits and Systems, 2004. ISCAS '04, Proceedings of the 2004 International Symposium on, vol. 3, No., pp. III, 789-92 vol. 3, May 23-26, 2004, 4 pages.

Boyce J, "Weighted Prediction Clean-up," 6th Meeting: Awaji, Island, JP, Dec. 5-13, 2002, JVT-F034, 7 pages.

Kikuchi Y., et al., "Multi-Frame Interpolative Prediction with Modified Syntax," 3rd Meeting: Fairfax, Virginia, USA, Mar. 6-10, 2002, JVT-0066, 13 pages.

\* cited by examiner

DIFFERENT WEIGHTS FOR UNI-DIRECTIONAL PREDICTION AND BI-DIRECTIONAL PREDICTION IN VIDEO CODING

TECHNICAL FIELD

The disclosure relates to video coding and, more particularly, video coding techniques for B-units that use bi-directional weighted prediction for B-video blocks and uni-directional weighted prediction for P-video blocks.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences.

In video encoding, compression often includes spatial prediction, motion estimation and motion compensation. Intra-coding relies on spatial prediction and transform coding, such as discrete cosine transform (DCT) coding, to reduce or remove spatial redundancy between video blocks within a given video frame. Inter-coding relies on temporal prediction and transform coding to reduce or remove temporal redundancy between video blocks of successive video frames of a video sequence. Intra-coded frames ("I-frames") are often used as random access points as well as references for the inter-coding of other frames. I-frames, however, typically exhibit less compression than other frames. The term I-units may refer to I-frames, I-slices or other independently decodable portions of an I-frame.

For inter-coding, a video encoder performs motion estimation to track the movement of matching video blocks between two or more adjacent frames or other coded units, such as slices of frames. Inter-coded frames may comprise predictive frames ("P-frames"), which may include blocks predicted from a previous frame, and bi-directional predictive frames ("B-frames"), which may include blocks predicted from a previous frame and a subsequent frame of a video sequence. The terms P-frames and B-frames are somewhat historic in the sense that early coding techniques limited prediction in specific directions. Newer coding formats and standards may not limit the prediction direction of P-frames or B-frames. Thus, the term "bi-directional" now refers to prediction based on two or more lists of reference data regardless of the temporal relationship of such reference data relative to the data being coded.

Consistent with newer video standards such as ITU H.264, for example, bi-directional prediction may be based on two different lists which do not necessarily need to have data that resides temporally before and after the current video block. In other words, B-video blocks may be predicted from two lists of data, which may correspond to data from two previous frames, two subsequent frames, or one previous frame and one subsequent frame. In contrast, uni-directional prediction refers to prediction of P-video blocks based on one list, i.e., one data structure, which may correspond to one predictive frame, e.g., one previous frame or one subsequent frame. B-frames and P-frames may be more generally referred to as P-units and B-units. P-units and B-units may also be realized in smaller coded units, such as slices of frames or portions of frames. B-units may include B-video blocks, P-video blocks or I-video blocks. P-units may include P-video blocks or I-video blocks. I-units may include only I-video blocks.

For P- and B-video blocks, motion estimation generates motion vectors, which indicate the displacement of the video blocks relative to corresponding prediction video blocks in predictive reference frame(s) or other coded units. Motion compensation uses the motion vectors to generate prediction video blocks from the predictive reference frame(s) or other coded units. After motion compensation, a residual video block is formed by subtracting the prediction video block from the original video block to be coded. The video encoder usually applies transform, quantization and entropy coding processes to further reduce the bit rate associated with communication of the residual block. I-and P-units are commonly used to define reference blocks for the inter-coding of P- and B-units.

SUMMARY

This disclosure describes video encoding and decoding techniques applicable to bidirectional and unidirectional prediction. In bidirectional prediction, a video block is predictively encoded and decoded based on two different lists of predictive reference data, whereas in uni-directional prediction a video block is predictively encoded and decoded based on one list of predictive reference data. Explicit weighted prediction generally refers to unidirectional prediction or bi-prediction prediction that relies on explicit weights that are defined at the encoder and communicated in the bitstream. The weights are applied to pixel values of predictive reference data to define weighted reference data used in the encoding and decoding of video data.

The techniques described in this disclosure provide for the decoupling of uni-directional and bi-directional prediction weights, particularly for explicit weighted predictions of video blocks within a B-unit. According to this disclosure, explicit weights communicated in the bitstream may be applied by a decoder for explicit bi-directional prediction, but different weights (which may be default weights or separately defined explicit unidirectional weights) may be used for explicit unidirectional prediction. The described techniques may improve video quality relative to techniques that use the same explicit weights for explicit bidirectional prediction and explicit uni-directional prediction within a B-unit.

In one example, this disclosure describes a method of decoding video data in a video decoder. The method comprises receiving a coded unit at the video decoder, wherein the coded unit includes syntax elements indicating explicit weights to be applied during explicit weighted prediction of one or more video blocks in the coded unit, applying the explicit weights via the video decoder for bidirectional explicit weighted prediction of one or more bi-directional video blocks in the coded unit, and applying one or more different weights via the video decoder for unidirectional explicit weighted prediction of one or more unidirectional video blocks in the coded unit.

In another example, this disclosure describes a method of encoding video data in a video encoder. The method comprises encoding a coded unit at the video encoder, wherein the coded unit includes syntax elements indicating explicit weights to be applied during explicit weighted prediction of one or more video blocks in the coded unit, encoding via the video encoder one or more bi-directional video blocks in the coded unit based on the explicit weights, and encoding via the video encoder one or more unidirectional video blocks in the coded unit based on one or more different weights.

In another example, this disclosure describes a video decoding apparatus comprising an entropy unit that receives a coded unit and decodes one or more syntax elements of the coded unit, wherein the syntax elements indicate explicit weights to be applied during explicit weighted prediction of one or more video blocks in the coded unit, and a prediction unit that applies the explicit weights for bi-directional explicit weighted prediction of one or more bi-directional video blocks in the coded unit, and applies one or more different weights for uni-directional explicit weighted prediction of one or more uni-directional video blocks in the coded unit.

In another example, this disclosure describes a video encoding apparatus that encodes video data. The apparatus comprises a memory that stores the video data and two or more lists of data used to predictively encode the video data, and a prediction unit that encodes a coded unit, wherein the coded unit includes syntax elements indicating explicit weights to be applied during explicit weighted prediction of one or more video blocks in the coded unit, encodes one or more bi-directional video blocks in the coded unit based on the explicit weights, and encodes one or more uni-directional video blocks in the coded unit based on one or more different weights.

In another example, this disclosure describe a device that decodes video data, the device comprising means for receiving a coded unit, wherein the coded unit includes syntax elements indicating explicit weights to be applied during explicit weighted prediction of one or more video blocks in the coded unit, means for applying the explicit weights for bi-directional explicit weighted prediction of one or more bi-directional video blocks in the coded unit, and means for applying one or more different weights for uni-directional explicit weighted prediction of one or more uni-directional video blocks in the coded unit.

In another example, this disclosure describes a device that encodes video data, the device comprising means for encoding a coded unit, wherein the coded unit includes syntax elements indicating explicit weights to be applied during explicit weighted prediction of one or more video blocks in the coded unit, means for encoding one or more bi-directional video blocks in the coded unit based on the explicit weights, and means for encoding one or more uni-directional video blocks in the coded unit based on one or more different weights.

The techniques described in this disclosure may be implemented in hardware, software, firmware, or any combination thereof If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable storage medium and loaded and executed in the processor.

Accordingly, this disclosure also describes a computer-readable storage medium comprising instructions that when executed cause a processor to decode video data. Upon receiving a coded unit that includes syntax elements indicating explicit weights to be applied during explicit weighted prediction of one or more video blocks in the coded unit, the instructions cause the processor to apply the explicit weights for bidirectional explicit weighted prediction of one or more bi-directional video blocks in the coded unit, and apply one or more different weights for uni-directional explicit weighted prediction of one or more unidirectional video blocks in the coded unit.

In addition, this disclosure describes a computer-readable storage medium comprising instructions that when executed cause a processor to encode video data, wherein the instructions cause the processor to encode a coded unit that includes syntax elements indicating explicit weights to be applied during explicit weighted prediction of one or more video blocks in the coded unit, encode one or more bi-directional video blocks in the coded unit based on the explicit weights, and encode one or more uni-directional video blocks in the coded unit based on one or more different weights.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
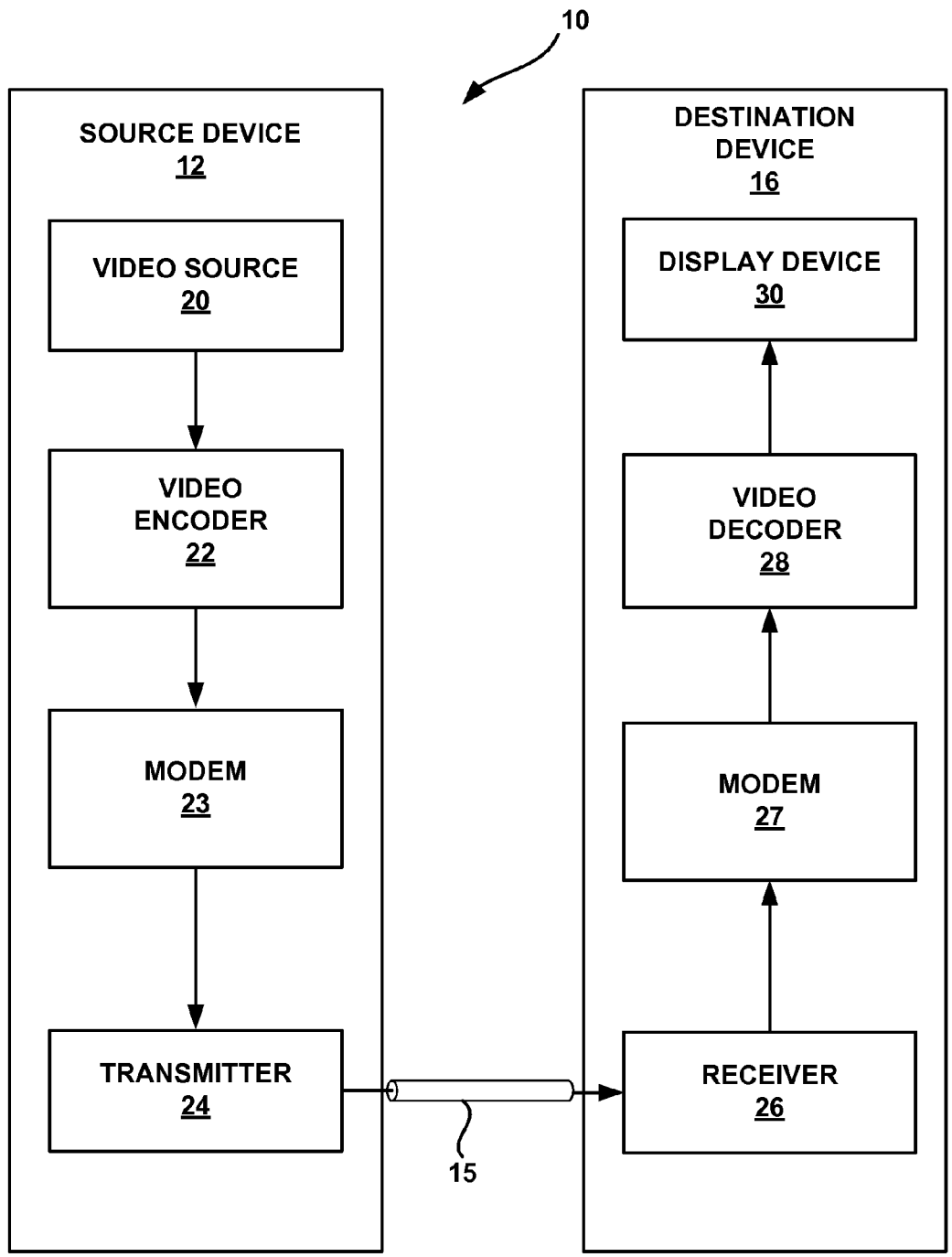
FIG. 1 is a block diagram illustrating one exemplary video encoding and decoding system that may implement techniques of this disclosure.

This disclosure describes video encoding and decoding techniques applicable to bi-directional coded units (e.g., B-units) such as B-frames, B-slices or other independently coded units that include at least some video blocks that are predicted based on two different lists of predictive reference data. B-units may include many different types of video blocks, including B-video blocks that are encoded and decoded based on two different lists of predictive reference data, P-video blocks that are encoded and decoded based on one list of predictive reference data, and I-video blocks that are encoded based on intra-data within that same coded unit.

One encoding technique that has been developed and applied in coding standards such as ITU H.264 is referred to as weighted prediction. Weighted prediction refers to prediction in which one or more weights (sometimes called weight factors) are assigned to the predictive data. In this case, the predictive reference data may be weighted according to the weight factors in order to defined weighted predictive reference data. Weighted prediction is often applied to B-units, and specifically B-video blocks within the B-units, but may also be applied to P-units or other coded units. In the case of B-video blocks within B-units, weights may be assigned to the two different lists of predictive data in order to weight the predictive reference data, which is then used to encode the B-video blocks, so that improved predictive reference data may be formed. Conventionally, when weighted prediction is used for a B-unit, the same weights assigned to different lists of data are applied for both bi-directional prediction of B-video blocks within the B-unit, and uni-directional prediction of P-video blocks within the B-unit.

In this context, there also exist different types of weighted prediction, which may be referred to as explicit weighted prediction, implicit weighted prediction and default weighted prediction. Explicit weighted prediction and implicit weighted prediction may correspond to different weighted prediction modes defined in ITU H.264. Default weighted prediction may a specific case of explicit weighed prediction in which the weights factors are defined by a default setting.

Explicit weighted prediction refers to weighted prediction in which the weight factors are dynamically defined as part of the coding process, and encoded into the bitstream. Implicit weighted prediction refers to weighted prediction in which the weight factors associated with two or more different lists are defined based on some implicit factors associated with the data. For example, implicit weight factors may be defined by the temporal positions of the data in the two different lists relative to the data being predictively coded. If data in list 0 is temporally closer to the data being predictively coded than data in list 1, then the data is list 0 may be assigned a greater implicit weigh factor in implicit weighted prediction. The weight factors can be applied with respect to raw data in the different lists of reference data (e.g., reference pixel data) in order to adjust the predictive reference data in a weighted manner so as to promote reference data this may be more similar to the data being coded than would otherwise be achieved without the weightings.

As mentioned, default weighted prediction refers to weighted prediction in which the weight factors associated with two or more different lists are pre-defined by some default setting. Default weighted prediction, in some cases, may assign equal weightings to each of the lists. Default weights may be communicated in the bitstream (like the explicit weights) or, in some cases, may be excluded from the bitstream and known at the encoder and the decoder. Unlike default weights, which are generally static for different scenarios, explicit weights may be defined based on an analysis of the weighted predictive data in order to promote higher quality predictive data that can promote improved compression. In some cases, default weighted prediction or explicit weighted prediction are used at the encoder to define the weights that will be communicated for a coded unit. In this case, the decoder may treat these two scenarios as the same coding mode (e.g., different versions of the explicit weighed prediction mode). The weights that are transmitted in the bitstream for that coded unit are defined based on a default setting for default weighted prediction, and are defined based on an analysis of predictive data for explicit weighted prediction.

In accordance with this disclosure, explicit weights communicated in the bitstream may be applied by a decoder for explicit bi-directional prediction, but different weights (which may be default weights or separately defined explicit uni-directional weights) may be used for explicit uni-directional prediction. In this way, bi-directional prediction of B-video blocks within a B-unit and unidirectional prediction of P-video blocks within the B-unit may apply different weight factors. Conventionally, when weighted prediction is defined and signaled for a B-unit, the same weights assigned to different lists of data are applied for both bi-directional prediction of B-video blocks within the B-unit, and uni-directional prediction of P-video blocks within the B-unit. The techniques of this disclosure recognize that coding efficiency and coding quality can be improved by eliminating these conventional constraints.

FIG. 1 is a block diagram illustrating one exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 comprise wireless communication devices, such as wireless handsets, so-called cellular or satellite radiotelephones, or any devices that can communicate video information over a communication channel 15, which may or may not be wireless. The techniques of this disclosure, however, which concern the decoupling of uni-directional and bi-directional prediction weights for explicit weighted predictions of video blocks within a B-unit, are not necessarily limited to wireless applications or settings.

In the example of FIG. 1, source device 12 may include a video source 20, video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to encode one or more bi-directional video blocks in the coded unit based on the explicit weights, and encode one or more uni-directional video blocks in the coded unit based on one or more different weights. Likewise, video decoder 28 may apply the explicit weights for bi-directional explicit weighted prediction of one or more bi-directional video blocks in the coded unit, and may apply one or more different weights via the video decoder for uni-directional explicit weighted prediction of one or more uni-directional video blocks in the coded unit.

The illustrated system 10 of FIG. 1 is merely exemplary. The techniques of this disclosure may be performed by any coding device that supports uni-directional and bi-directional motion compensated prediction. Source device 12 and destination device 16 are merely examples of such coding devices in which source device 12 generates coded video data for transmission to destination device 16. In some cases, devices 12, 16 may operate in a substantially symmetrical manner such that each of devices 12, 16 includes video encoding and decoding components. Hence, system 10 may support one-way or two-way video transmission between video devices 12, 16, e.g., for video streaming, video playback, video broadcasting, or video telephony.

Video source 20 of source device 12 may include a video capture device, such as a video camera, a video archive containing previously captured video, or a video feed from a video content provider. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 16 receives information over channel 15, and modem 27 demodulates the information. Again, the video encoding process may implement one or more of the techniques described herein to decouple bi-directional prediction weights from uni-directional prediction weights. The information communicated over channel 15 may include information defined by video encoder 22 to define the weight factors, and this information may be used by video decoder 28 consistent with this disclosure. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 15 may comprise any wireless or wired communication medium, such as a radio frequency (RF) spectrum or one or more physical transmission lines, or any combination of wireless and wired media. Accordingly, modem 23 and transmitter 24 may support many possible wireless protocols, wired protocols or wired and wireless protocols. Communication channel 15 may form part of a packet-based network, such as a local area network (LAN), a wide-area network (WAN), or a global network, such as the Internet, comprising an interconnection of one or more networks. Communication channel 15 generally represents any suitable communication medium, or collection of different communication media, for transmitting video data from source device 12 to destination device 16. Communication channel 15 may include routers, switches, base stations, or any other equipment that may be useful to facilitate communication from source device 12 to destination device 16.

Video encoder 22 and video decoder 28 may operate according to a video compression standard, such as the ITU-T H.264 standard, alternatively described as MPEG-4, Part 10, Advanced Video Coding (AVC). The techniques of this disclosure, however, are not limited to any particular coding standard. Furthermore, the techniques of this disclosure, in some respects, may be non-compliant with the ITU-T H.264 standard insofar as the ITU-T H.264 standard may define the same weight factors to be used for both uni-directional prediction and bi-directional prediction. In ITU-T H.264, for example, two explicit weights may be defined for two different lists of predictive data. In this case, if bi-directional prediction is used, then both weights are applied. If uni-directional prediction is used, then only one of the weights (i.e., the weight corresponding to the list used for that uni-directional prediction) is applied. The techniques of this disclosure may comprise communicating four different weights (i.e., two weights for bi-directional prediction and two weights for uni-directional prediction). However, in some cases, the uni-directional weights may be default weights that are not communicated, but are simply known and applied at the decoder. The uni-directional weights, particularly if such weights are default weights, may be communicated in the bitstream in some cases. In other cases, the uni-directional weights may be known and applied at the decoder without being communicated in the bitstream.

Although not shown in FIG. 1, in some aspects, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Work to advance the H.264/MPEG-4 AVC standard takes place in various forums of the ITU-T, such as the Key Technologies Area (KTA) forum. The KTA forum seeks, in part, coding technologies that exhibit higher coding efficiency than that exhibited by the H.264/AVC standard. The techniques described in this disclosure may provide for coding improvements relative to the H.264/AVC standard, but the techniques may be non-compliant with the H.264/AVC standard as defined at the filing of this application.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 and video decoder 28 may operate on video blocks within individual video frames in order to encode and decode the video data. The video blocks may have fixed or varying sizes, and may differ in size according to a specified coding standard. Each video frame may include a series of slices or other independently decodable units. Each slice may include a series of macroblocks, which may be arranged into sub-blocks. As an example, the ITU-T H.264 standard supports intra prediction in various block sizes, such as 16 by 16, 8 by 8, or 4 by 4 for luma components, and 8×8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components. Video blocks may comprise blocks of pixel data, or blocks of transformation coefficients, e.g., following a transformation process such as discrete cosine transform (DCT) coding or a conceptually similar transform process.

Smaller video blocks can provide better resolution, and may be used for locations of a video frame that include high levels of detail. In general, macroblocks and the various sub-blocks may be considered to be video blocks. In addition, a slice may be considered to be a series of video blocks, such as macroblocks and/or sub-blocks. Each slice may be an independently decodable unit of a video frame. Alternatively, frames themselves may be decodable units, or other portions of a frame may be defined as decodable units. The term "coded unit" refers to any independently decodable unit of a video frame such as an entire frame, a slice of a frame, a group of pictures (GOPs), or another independently decodable unit defined according to the coding techniques used.

Following inter-based predictive encoding (which includes uni-directional weighted prediction and bi-directional weighted prediction using different weight factors), and following any transforms (such as the 4×4 or 8×8 integer transform used in H.264/AVC or a discrete cosine transform or DCT), quantization may be performed. Quantization generally refers to a process in which residual transform coefficients are quantized to reduce the number of bits used to represent the coefficients. The quantization process may reduce the bit depth associated with some or all of the coefficients. For example, a 16-bit value may be rounded down to a 15-bit value during quantization. Following quantization, entropy coding may be performed, e.g., according to content adaptive variable length coding (CAVLC), context adaptive binary arithmetic coding (CABAC), or another entropy coding methodology.

The techniques of this disclosure are specifically applicable to weighted prediction of video blocks of B-units. In this case, predictive data used to encode video blocks is weighted so as to adjust the pixel values of the predictive data to define weighted predictive data. According to this disclosure, rather than assign a set of weights for the different lists of predictive data (e.g., list 0 and list 1), the video encoder 22 may assign two different sets of weights for the different lists, one set for use in bi-directional prediction and another set to define weights for the different lists used in uni-directional prediction.

As mentioned above, bi-directional prediction is prediction of so-called "B-video blocks" based on two different lists of data. B-video blocks may be predicted from two lists of data from two previous frames, two lists of data from subsequent frames, or one list of data from a previous frame and one from a subsequent frame. In contrast, uni-directional prediction refers to the prediction of P-video blocks based on one list, which may correspond to one predictive frame, e.g., one previous frame or one subsequent frame. B-frames and P-frames may be more generally referred to as P-units and B-units. P-units and B-units may also be realized in smaller coded units, such as slices of frames or portions of frames. B-units may include B-video blocks, P-video blocks or I-video blocks. P-units may include P-video blocks or I-video blocks. I-units may include only I-video blocks.

Weighted bi-directional prediction refers to bi-directional prediction that allows for weight factors to be assigned to the two different lists. Each list may comprise a set of data (e.g., pixel values) associated with a predictive frame or other coded unit. In weighted, bi-directional prediction one list may be weighted more heavily in generating the weighted predictive data. If one of the lists has data that is more similar to the video block being coded, for example, then that list may be weighted more heavily than the other list in defining weighted predictive data that is based on both lists.

In weighted uni-directional prediction, a given weight factor for a given list may be applied to the predictive data. Different weights may be applied to the different lists, but in this case, a given uni-directional prediction will only use the one weight corresponding to the list of data used for that uni-directional prediction. According to this disclosure, the weights defined for the two lists of data will differ for uni-directional prediction relative to those defined for bi-directional prediction. The techniques may be non-compliant with ITU H.264 as set forth at the time of this disclosure.

For different types of weighted bi-directional prediction in accordance with ITU-T H.264, video encoder 22 and video decoder 28 may generally support three different types of prediction modes. Explicit weighted prediction refers to weighted prediction in which the weight factors are dynamically defined as part of the coding process, and encoded into the bitstream. Explicit weighted prediction is different than implicit weighted prediction in this respect, e.g., explicit weighted prediction results in weight factors that are encoded as part of the bitstream.

Implicit weighted prediction refers to weighted prediction in which the weight factors associated with two or more different lists are defined based on some implicit factors associated with the data. For example, implicit weight factors may be defined by the relative temporal positions of the data in the two different lists relative to the data being predictively coded. In implicit weighted prediction, the weight factors are not included in the bitstream. Instead, video decoder 28 may be programmed to derive the implicit weight factors.

Default weighted prediction refers to weighted prediction in which the weight factors associated with two or more different lists are pre-defined by some default setting. Default weighted prediction, in some cases, may assign equal weightings to each of the lists. In default weighted prediction, the weight factors may be sent with the bitstream, or may be pre-defined at the encoder and decoder and not sent in the bitstream. When default weight factors as sent in the bitstream, the default prediction mode may be considered a special case of the explicit prediction mode (explained above). Therefore, default prediction may also be described as the application of default weights of the explicit prediction mode. In this case, it may be said that only two different weighted prediction modes exist, e.g., explicit and implicit, but the explicit mode may support default weights or explicitly defined weights.

Figure 2:
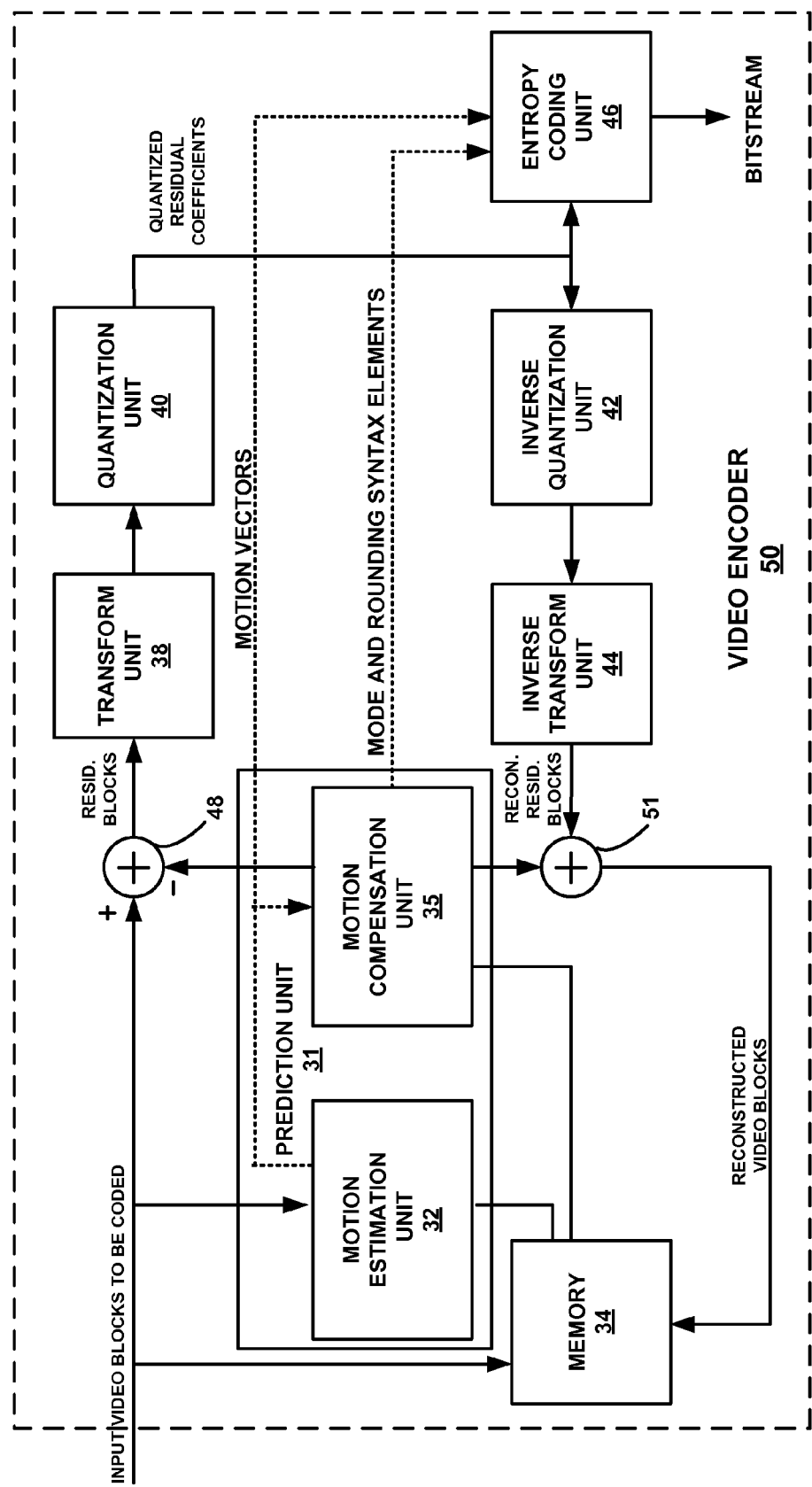
FIG. 2 is a block diagram illustrating an example of a video encoder that may perform weighted prediction techniques consistent with this disclosure.

FIG. 2 is a block diagram illustrating an example of a video encoder 50 that may perform techniques consistent with this disclosure. Video encoder 50 may correspond to video encoder 22 of source device 12, or a video encoder of a different device. Video encoder 50 may perform intra- and inter-coding of blocks within video frames, although intra-coding components are not shown in FIG. 2 for ease of illustration. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I-mode) may refer to the spatial based compression mode and Inter-modes such as prediction (P-mode) or bi-directional (B-mode) may refer to the temporal based compression modes.

As shown in FIG. 2, video encoder 50 receives a current video block within a video frame or slice to be encoded. In the example of FIG. 2, video encoder 50 includes a prediction unit 31 comprising motion estimation unit 32 and motion compensation unit 35. Video encoder 50 also includes a memory 34, an adder 48, a transform unit 38, a quantization unit 40, and an entropy coding unit 46. For video block reconstruction, video encoder 50 also includes an inverse quantization unit 42, an inverse transform unit 44, and an adder 51. Video encoder 50 may also include a deblocking filter (not shown) to filter block boundaries to remove blockiness artifacts from reconstructed video. If desired, the deblocking filter would typically filter the output of adder 51.

During the encoding process, video encoder 50 receives a video block to be coded, and motion estimation unit 32 and motion compensation unit 35 perform inter-predictive coding. Motion estimation unit 32 and motion compensation unit 35 may be highly integrated, but are illustrated separately for conceptual purposes. Motion estimation is typically considered the process of generating motion vectors, which estimate motion for video blocks. A motion vector, for example, may indicate the displacement of a predictive block within a predictive frame (or other coded unit) relative to the current block being coded within the current frame (or other coded unit). Motion compensation is typically considered the process of fetching or generating the predictive block based on the motion vector determined by motion estimation. Again, motion estimation unit 32 and motion compensation unit 35 may be functionally integrated. For demonstrative purposes, the techniques described in this disclosure are described as being performed by prediction unit 31.

Motion estimation unit 32 selects the appropriate motion vector for the video block to be coded by comparing the video block to video blocks of one or more predictive coded units (e.g., a previous and/or future frame in terms of time or temporally). Motion estimation unit 32 may, as an example, select a motion vector for a B-frame in a number of ways. In one way, motion estimation unit 32 may select a previous or future frame from a first set of frames (referred to as list 0) and determine a motion vector using only this previous or future frame from list 0, which is one type of uni-directional motion estimation. Alternatively, motion estimation unit 32 may select a previous or future frame from a second set of frames (referred to as list 1) and determine a motion vector using only this previous or future frame from list 1, which is another type of uni-directional motion estimation. In yet another way, motion estimation unit 32 may select a first frame from list 0 and a second frame from list 1 and select one or more motion vectors from the first frame of list 0 and the second frame of list 1. This third form of prediction may be referred to as bi-predictive motion estimation.

Techniques of this disclosure may be implemented so as to decouple weight factors assigned to list 0 and list 1 for uni-directional motion compensation from the weight factors assigned to list 0 and list 1 for bidirectional motion compensation. The selected motion vector for any given list may point to a predictive video block that is most similar to the video block being coded, e.g., as defined by a metric such as sum of absolute difference (SAD) or sum of squared difference (SSD) of pixel values of the predictive block relative to pixel values of the block being coded. The appropriate weight factor or weight factors may be applied by motion compensation unit 35 when creating the predictive data based on the motion vectors. That is, the weight factors (which are different for uni-directional and bi-directional prediction) are applied to weight the predictive data so as to define weighted predictive data, which is used for the encoding or decoding of the current video block.

According to the ITU-T H.264/AVC standard, different motion-compensated bi-predictive algorithms or modes may be used to predict a B-frame or portions thereof, such as video blocks, macroblocks or any other discreet and/or contiguous portion of a B-frame. A first motion-compensated bi-predictive algorithm or mode, which is commonly referred to as default weighted prediction, may involve applying default weights to each identified video block of the first frame of list 0 and the second frame of list 1. The default weights may be programmed according to the standard, and are often selected to be equal for default weighted prediction. The weighted blocks of the first and second frames are then added together and divided by the total number of frames used to predict the B-frame, e.g., two in this instance. Often, this division is accomplished by adding 1 to the addition of the weighted blocks of the first and second frames and then shifting the result to the right by one bit. The addition of 1 is a rounding adjustment, which may be eliminated in for some embodiments.

In some cases, the addition of 1 (the rounding adjustment) prior to the right shift by one may be avoided, thus eliminating upward biased rounding. Motion compensation unit 35 may generate both a weighted block with rounding and a weighted block without rounding, and may select the block that achieves the best coding efficiency.

More generally, bi-directional weighted prediction may be given by:

$$\text{pred}(i,j)=(\text{pred}0(i,j)*w0+\text{pred}1(i,j)*w1+2^r)>>(r+1)$$

where pred(i,j) is data associated with the weighed prediction block, pred0(i,j) is data from list 0, pred1(i,j) is data from list 1, w0 and w1 are the weight factors, $2^r$ is the rounding term, and >> is a right shift operation by (r+1) bits. In some cases, two different versions of pred(i,j) may be generated and considered by motion compensation unit 35. The first is consistent with the equation above, and the second is consistent with the equation above without rounding, i.e., with the term "$2^r$" removed from the equation. Eliminating this rounding may achieve better weighted predictive data in some cases, which can improve coding efficiency. Motion compensation unit 35 may generate one or more syntax elements to define whether or not rounding was used for a given video block or set of video blocks. Both the bi-directional prediction mode and the one or more syntax elements indicating whether rounding was used may be output form motion compensation unit 35 to entropy coding unit 46 for inclusion in the encoded bitstream.

B pictures use two lists of previously-coded reference pictures, list 0 and list 1. These two lists can each contain past and/or future coded pictures in temporal order. Blocks in a B picture may be predicted in one of several ways: motion-compensated prediction from a list 0 reference picture, motion-compensated prediction from a list 1 reference picture, or motion-compensated prediction from the combination of both list 0 and list 1 reference pictures. To get a combination of both list 0 and list 1 reference pictures, two motion compensated reference areas are obtained from the list 0 and list 1 reference pictures, respectively, and the two reference areas may be combined in a weighted manner. Their combination can then be used to predict the current block.

In this disclosure, the term "B pictures" will be used to refer generally to any types of B units, which may be B frames, B slices, or possibly other video units that include at least some B video blocks. As mentioned, B pictures may allow 3 types of weighted prediction, default, implicit and explicit. Again, sometimes default prediction is considered a specific type of explicit prediction with the explicit weight factors being defined by a default setting. For simplicity, only forward prediction in uni-directional prediction is shown in the discussion below, although backwards prediction could also be used as another type of uni-directional prediction.

Default weighted prediction may be defined by the following equations for uni-directional prediction and bi-directional prediction, respectively.

Uni-directional prediction: pred(i,j)=pred0(i,j)

Bi-directional prediction: pred(i,j)=(pred0(i,j)+pred1(i,j)+1)>>1 where pred0(i,j) and pred1(i,j) are prediction data from list 0 and list 1.

Implicit weighted prediction may be defined by the following equations for uni-directional prediction and bi-directional prediction, respectively.

Uni-directional prediction: pred(i,j)=pred0(i,j)

Bi-directional prediction: pred(i,j)=(pred0(i,j)*w0+pred1(i,j)*w1+32)>>6

In this case, each prediction is scaled by a weighting factor w0 or w1, where w0 and w1 are calculated based on the relative temporal position of the list 0 and list 1 reference pictures.

Explicit weighted prediction may be defined by the following equations for uni-directional prediction and bi-directional prediction, respectively.

Uni-directional prediction: $\text{pred}(i,j)=(\text{pred0}(i,j)*w0+2^{r-1})>>r+o1$ Bi-directional prediction: $\text{pred}(i,j)=(\text{pred0}(i,j)*w0+\text{pred1}(i,j)*w1+2^r)>>(r+1)+((o1+o2+1)>>1)$ In this case, the weighting factors are determined by the encoder and transmitted in the slice header, and o1 and o2 are picture offsets for list 0 and list 1 reference pictures respectively.

Conventionally, rounding adjustments are always used in bi-directional prediction. According to the equations above, a rounding adjustment of 1 is used in the default weighted prediction prior to a right shift by one, and a rounding adjustment of 32 is used in the implicit weighted prediction prior to a right shift by six. Generally, a rounding adjustment of $2^{r-1}$ is commonly used prior to a right shift by r, where r represents a positive integer.

Such frequent and biased rounding operations can reduce precision of prediction. Furthermore, in the bi-directional prediction of the explicit weighted prediction, there are actually 2 roundings, one for the reference pictures and the other for the offsets. Therefore, in this case, the rounding error can accumulate. In accordance with one aspect of this disclosure, instead of doing 2 separate roundings, the video encoder can add the offsets to the weighted prediction before right shift as the following:

$$\text{pred}(i,j)=(\text{pred0}(i,j)*w0+\text{pred1}(i,j)*w1+((o1+o2)<<r)+2^r)>>(r+1),$$

where pred(i,j) is the weighted prediction data associated with rounding, pred0(i,j) is data from list 0, pred1(i,j) is data from list 1, w0 and w1 are weight factors, o1 and o2 are offsets, and r and $2^r$ are rounding terms that provide the rounding in conjunction with a right shift operation ">>" by (r+1) bits. This may provide better prediction accuracy. In this case, a new syntax element may also be defined to allow for combination of two different offsets (o1 and o2) into one offset. Furthermore, in this case, a rounding value may comprise the rounding adjustment described above (e.g., $2^r$ prior to a right shift operation by (r+1) bits) as well as another a rounding value ("r") associated with the offset. The equation above may also be modified slightly to provide higher precision for the offsets. If higher precision for the offsets are desired, the offsets may be multiplied by factors (such as by 2) and then rounded to integer numbers. The left shift may also be changed to account for this added precision to the offset.

Another problem in explicit weighted prediction is that unidirectional prediction and bidirectional prediction may share the same weights and offsets. In order to have more flexibility for better prediction, unidirectional prediction and bi-directional prediction may be decoupled in accordance with this disclosure. In this case, uni-directional prediction and bi-directional prediction may define different weights and offsets for a given type of prediction (default, implicit or explicit). New syntax elements may be defined for explicit prediction to allow for better prediction. An encoder can include the syntax elements in a coded bitstream to signal the weight factors used and possibly different rounding modes used by the encoder, so that the same weight factors and rounding modes can be used by the decoder.

It is beneficial to adaptively select rounding adjustments. One way of doing this is to generate two or more different sets of predictive data (and possibly encode a video block several times) based on the two or more different sets of predictive data. One set of the predictive data may have nonzero rounding and the other may eliminate the rounding. In still other examples, upward rounding, downward rounding, and no rounding may be considered. Motion compensation unit 35 may generate these different types of predictive data, and may conduct a rate-distortion (RD) analysis to select the best predictive data for a given video block.

Rate-distortion (RD) analysis is fairly common in video coding, and generally involves the calculation of a cost metric indicative of the coding cost. The cost metric may balance the number of bits required for the coding (the rate) and the level of quality associated with the coding (the distortion). A typical rate-distortion cost calculation may generally correspond to the format of:

$$J(\lambda)=\lambda R+D,$$

where $J(\lambda)$ is the cost, R is the bit rate, D is the distortion, and $\lambda$ is the Lagrange multiplier.

One way for video encoder 50 to identify the most desired prediction data is to use motion estimation unit 32 to first find motion vectors, and then implement motion compensation unit 35 and adder 48 to calculate prediction errors with and without rounding adjustments. Motion compensation unit 35 may then select the prediction data that yields the least prediction error. The prediction error can be calculated by using the sum of absolute difference between the prediction data and the current data being encoded.

According to this disclosure, the weights (and optionally the offsets) defined for explicit weighted prediction may be different for uni-directional and bi-directional prediction. Explicit weights may be calculated as:

$$\text{Explicit weight=default weight}*(DC\_Current\_frame/DC\_Reference\_frame)$$

In this case, the term "DC_Current_frame" is the sum of all the pixels of the current frame (or other coded unit), and the term "DC_Reference_frame" is the sum of all the pixels of the reference frame (or other coded unit), which can be from list 0 or list 1.

Each reference frame in list 0 and in list 1 may have explicit weights assigned to them. Furthermore, each reference frame has one weight for uni-directional prediction and each pair of reference pictures involved in bidirectional prediction have a pair of weights for both reference frames. The problem in conventional explicit weighted prediction is that uni-directional prediction and bi-directional prediction share the same weights.

As an example, if:
F=current frame
F0=reference frame in list0
F1=reference frame in list1
w0=explicit weight for F0
w1=explicit weight for F1
wd=Default Weight
Then:

$$w0 = wd * \left(\frac{\sum_i \sum_j F(i,j)}{\sum_i \sum_j F0(i,j)}\right)$$

$$w1 = wd * \left(\frac{\sum_i \sum_j F(i,j)}{\sum_i \sum_j F1(i,j)}\right).$$

Uni-directional prediction from list 0 may be given by:

$$\text{pred}(i,j)=(\text{pred0}(ij)*w0+2^{r-1})>>r$$

Uni-directional prediction from list 1 may be given by:

$$pred(i,j)=(pred1(i,j)*w1+2^{r-1})>>r$$

Bi-directional prediction may be given by:

$$pred(i,j)=(pred0(i,j)*w0+pred1(i,j)*w1+2^{r-1})>>r$$

In order to have more flexibility for better prediction, weights for uni-directional prediction and bi-directional prediction can be decoupled.

Therefore, according to this disclosure, uni-directional prediction from list 0 may be given by:

$$pred(i,j)=(pred0(i,j)*w0+2^{r-1})>>r.$$

Uni-directional prediction from list 1 may be given by:

$$pred(i,j)=(pred1(i,j)*w1+2^{r-1})>>r, \text{ and}$$

bi-directional prediction may be given by:

$$pred(i,j)=(pred0(i,j)*w2+pred1(i,j)*w3+2^{r-1})>>r$$

In this case, w2 is different than w0, and w3 is different than w1.

For uni-directional prediction, prediction unit 31 may use and encode the original default weights. For bi-directional prediction, prediction unit 31 may use and encode the explicit weights calculated by minimizing an error between a current frame (or other coded unit) and a virtual frame (or other reference unit) formed using reference frame from list 0 and list 1.

As an example, if:
F=current frame
F0=reference frame in list0
F1=reference frame in list1
w=explicit weight
Fv=virtual frame=wF0+(1−w)F1
e=error between current frame and the virtual frame.
Then, $$e = F - Fv$$
$$= F - (wF0 + (1-w)F1)$$
$$= F - wF0 + wF1 - F1$$
$$= (F - F1) - w(F0 - F1)$$

The error may be minimized as follows:

$$0 = \frac{\partial(e^2)}{\partial w}$$

$$w = \frac{\sum_i \sum_j ((F(i,j) - F1(i,j))(F0(i,j) - F1(i,j)))}{\sum_i \sum_j ((F0(i,j) - F1(i,j))^2)}$$

Thus, in this case, bi-directional prediction may be given by:

$$pred(i,j)=(pred0(i,j)*w+pred1(i,j)*(1-w)+2^{r-1})>>r$$

Furthermore, in this case, uni-directional prediction from list 0 may be given by:

$$pred(i,j)=(pred0(i,j)*wd+2^{r-1})>>r$$

Also, in this case, uni-directional prediction from list 1 may be given by:

$$pred(i,j)=(pred1(i,j)*wd+2^{r-1})>>r$$

These different weights may be encoded into syntax elements of a coded unit, and later transmitted with the coded unit (e.g., in a slice header) if the B-unit is defined to apply weighted prediction. Therefore, the decoder (not shown in FIG. 2) may receive these weights and use the weights only if a given block demands bi-directional prediction. Otherwise, the decoder may use default weights for uni-directional prediction. The default weights may be included in the syntax elements, or may be excluded from the syntax elements and pre-defined at the decoder as default weights to apply in the absence of explicit weights in the syntax.

In some cases, in order to find the best weighted prediction, video encoder 50 may perform encoding using all possible values of weights and select the best weight based on rate-distortion cost. To reduce the complexity, however, video encoder 50 may perform a first estimation of the weights by using the techniques described above, and then consider other weights that are close to the estimated weights. In other words, rather than perform an exhaustive search of the best prediction by considering every possible set of weights, video encoder 50 may use the techniques described above to estimate the weights, and may then consider other weights that are greater and/or less than the estimated weights within a range.

As an example, the weights may have any value between 0 and 127. One way to identify the best weights is to conduct an exhaustive search that considers every value of weights and selects the best weights based on the lowest rate-distortion cost. However, a faster way to identify the best weights may be to conduct a first guess of the weights using methods outlined above, and then consider other weights that are close to the estimated weights, e.g., within a factor. For example, if the methods above yield a weight of 67, then, values of plus or minus 10 around the estimated value of 67 may also be considered (i.e., values between 57 and 77). In this case, the exhaustive search within the smaller range of 57 to 77 may be performed to select the best weights. Since the exhaustive search is not performed over the entire range of 0 to 127, the techniques are simplified relative to a complete exhaustive search.

To further reduce the encoder complexity, during explicit weighted prediction, if the calculated weights are the same as the default weights, then prediction unit 31 may skip the explicit weighted prediction steps. In any case, different weights for bi-directional prediction and unidirectional prediction may improve the quality of B pictures and achieve gains in coding efficiency.

In some cases, in order to find the best weighted prediction, video encoder 50 may perform multi-pass encoding and select the best mode based on rate-distortion cost. One way to do this is an exhaustive search where motion compensation unit 35 generates every possible weighted prediction data and selects the best one. To reduce the complexity, however, motion compensation unit 35 may implement additional techniques of this disclosure, e.g., to first select between default weighted prediction and implicit weighted prediction, and then to compare the selection to explicit weighted prediction. Motion compensation unit 35 may calculate weights and offsets associated with explicit weighted prediction, and may also use the explicit weighted prediction framework to add offsets to data otherwise associated with default weighted prediction or implicit weighted prediction, whichever was selected. Thus, there may be two or more sets of offsets calculated by motion compensation unit 35. A first set of offsets may be calculated by using known weights used in the default weighted prediction or the implicit weighted prediction, and the second set of offsets may be calculated jointly with weights as part of a normal calculation of explicit weighted prediction, e.g., by minimizing the motion compensated prediction error.

To further reduce the complexity, during explicit weighted prediction, if the offsets are zero, motion compensation unit 35 may skip the explicit weighted prediction that uses default weights or implicit weights. Also, if the offsets are zero and calculated weights have no change, motion compensation unit 35 may skip the typical explicit weighted prediction that uses calculated weights and offsets.

Once the desired prediction data is identified by motion compensation unit 35, as described herein, video encoder 50 forms a residual video block by subtracting the prediction data from the original video block being coded. Adder 48 represents the component or components that perform this subtraction operation. Transform unit 38 applies a transform, such as a discrete cosine transform (DCT) or a conceptually similar transform, to the residual block, producing a video block comprising residual transform block coefficients. Transform unit 38, for example, may perform other transforms, such as those defined by the H.264 standard, which are conceptually similar to DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

Quantization unit 40 quantizes the residual transform coefficients to further reduce bit rate. The quantization process may reduce the bit depth associated with some or all of the coefficients. For example, a 9-bit value may be rounded down to an 8-bit value during quantization. In addition, quantization unit 40 may also quantize the different offsets for cases where offset is used.

Following quantization, entropy coding unit 46 entropy codes the quantized transform coefficients. For example, entropy coding unit 46 may perform content adaptive variable length coding (CAVLC), context adaptive binary arithmetic coding (CABAC), or another entropy coding methodology. Following the entropy coding by entropy coding unit 46, the encoded video may be transmitted to another device or archived for later transmission or retrieval. The coded bitstream may include entropy coded residual blocks, motion vectors for such blocks, and other syntax such as the syntax elements described herein for communicating different weights for uni-directional prediction and bidirectional prediction.

Inverse quantization unit 42 and inverse transform unit 44 apply inverse quantization and inverse transformation, respectively, to reconstruct the residual block in the pixel domain, e.g., for later use as the reference block in the manner described above. Adder 51 adds the reconstructed residual block to the motion compensated prediction block produced by motion compensation unit 35 to produce a reconstructed video block for storage in memory 34. The reconstructed video block may be used by motion estimation unit 32 and motion compensation unit 35 as a reference block to inter-encode a block in a subsequent video frame.

Figure 3:
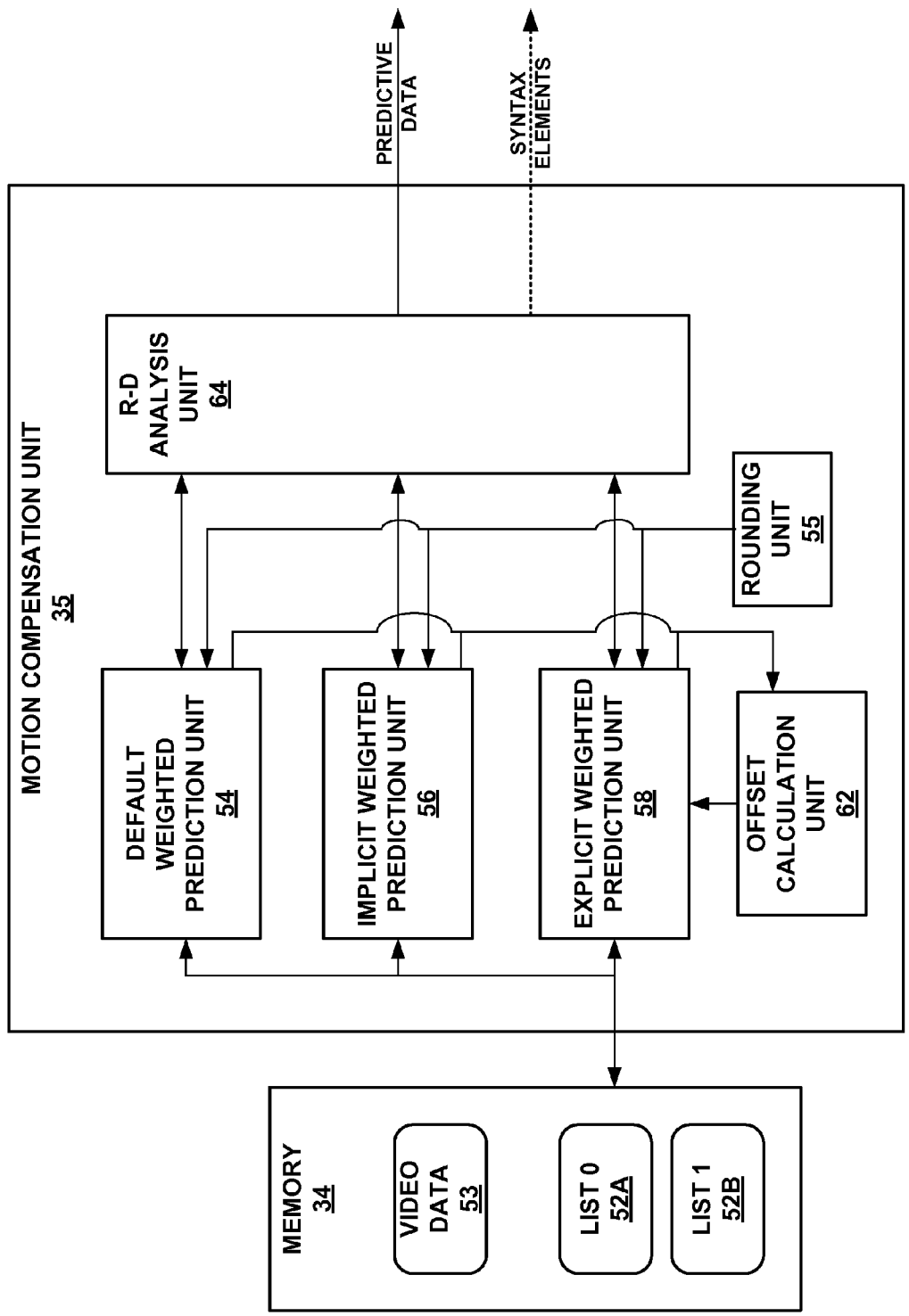
FIG. 3 is a block diagram illustrating an example of a motion compensation unit in more detail.

FIG. 3 is a block diagram illustrating an example of motion compensation unit 35 of FIG. 2 in more detail. As shown in the example of FIG. 3, motion compensation unit 35 couples to memory 34, which stores first and second sets of coded units or reference frames as list 0 52A and list 1 52B. In addition, memory 34 may store the current video data 53 coded. Memory 34 may comprise a shared memory structure, or possibly several different memories, storage units, buffers, or other types of storage that facilitates storage of any data discussed herein.

List 0 52A and list 1 52B are data associated with two different predictive units, e.g., data from two different frames or slices or macroblocks, in accordance with bi-directional prediction. Again, bidirectional prediction is not necessarily limited to any prediction directions, and thus list 0 52A and list 1 52B may store data from two previous frames or slices, two subsequent frames or slices, or one previous frame or slice and one subsequent frame or slice. Furthermore, in some cases, list 0 52A and/or list 1 52B could each include data associated with multiple frames, slices or macrblocks. List 0 52A and/or list 1 52B are simply two different sets of possible predictive data, and each list may include one frame or slice, or several frames, slices or macroblocks in any direction relative to the current video block being encoded.

As shown in FIG. 3, motion compensation unit 35 includes a default weighted prediction unit 54, an implicit weighted prediction unit 56, and an explicit weighted prediction unit 58. Units 54, 56 and 58 respectively perform default weighted prediction, implicit weighted prediction, and explicit weighted prediction as described herein. Rate-distortion (R-D) analysis unit 64 may select weighted prediction data among these possibilities, and may implement techniques of this disclosure to facilitate the selection process.

Motion compensation unit 35 also includes a rounding unit 55 that causes one or more of units 54, 56 and 58 to generate both rounded and unrounded versions of the respective weighted prediction data. Again, by eliminating rounding, weighted prediction data may be improved in some contexts.

In addition, motion compensation unit 35 includes an offset calculation unit 62, which calculates offset. According to ITU-T H.264/MPEG-4 AVC coding format, offset is only allowed in explicit weighted prediction. Therefore, in order to consider offset in the context of default weighted prediction or implicit weighted prediction, the weights determined by default weighted prediction unit 54 or implicit weighted prediction unit 56 may be forwarded to explicit weighted prediction unit 58 along with offset determined by offset calculation unit 62. In this way, explicit weighted prediction unit 58 can exploit the ITU-T H.264/MPEG-4 AVC coding format by adding offset to default weighted prediction data or implicit weighted prediction data for consideration by R-D analysis unit 64. In this case, explicit weighted prediction unit 58 generates not only the normal explicit weighted prediction data, but also prediction data that uses the weights determined by default weighted prediction unit 54 or implicit weighted prediction unit 56 in conjunction with offset determined by offset calculation unit 62.

Offset calculation unit may calculate offset as a difference between an average of video block values of a block being coded and an average of video block values of the prediction block. Offset may be calculated for luma video blocks, and in some cases, offset may be calculated for luma video blocks and for chroma video blocks.

R-D analysis unit 64 may analyze the different weighted predictive data, and may select the weighted predictive data that generates the best results in terms of quality, or in terms of rate and distortion. R-D analysis unit 64 outputs the selected weighted predictive data, which may be subtracted from the video block being coded via adder 48 (FIG. 2). Syntax elements may be used to inform a decoder of the manner or method that should be used to generate the weighted predictive data. The syntax elements, for example, may indicate whether or not rounding was used, and may indicate whether default, implicit or explicit weighted prediction should be used. If explicit weighted prediction should be used, the syntax elements may further identify the weight factors and the offset, which again may be weight factors and offset associated with explicit weighted prediction, or may be weight factors that were actually defined by default weighted prediction unit 54 or implicit weighted prediction unit 56 with the addition of offset from offset calculation unit 62.

Explicit weighted prediction unit 58 together with R-D analysis unit 64 may perform techniques of this disclosure to define different weights for explicit uni-directional prediction and explicit bi-directional prediction. The default weights defined by default weighted prediction unit 54 may be used for explicit uni-directional prediction whereas explicit weights defined by explicit weighted prediction unit 58 may be used for explicit bi-directional prediction.

Figure 4:
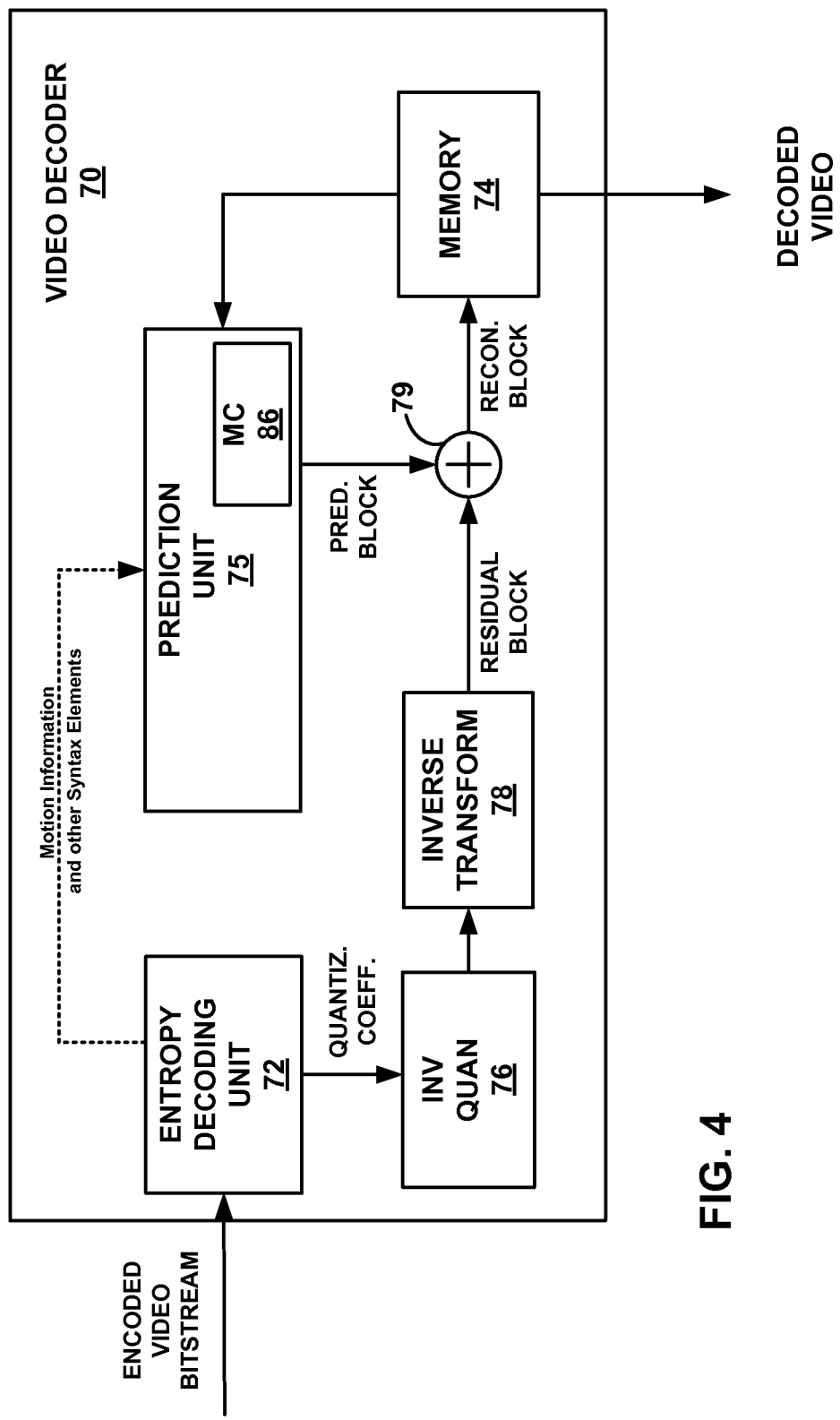
FIG. 4 is a block diagram illustrating an example of a video decoder that may perform weighted prediction techniques consistent with this disclosure.

FIG. 4 is a block diagram illustrating an exemplary video decoder 70, which may perform the reciprocal decoding techniques to the encoding techniques described above. Video decoder 70 may include an entropy decoding unit 72, a prediction unit 75, an inverse quantization unit 76, an inverse transform unit 78, a memory 74 and adder 79. Prediction unit 75 may include a motion compensation (MC) unit 88, as well as spatial prediction components, which are not shown for simplicity and ease of illustration.

Video decoder 70 receives a coded unit, wherein the coded unit includes syntax elements indicating explicit weights to be applied during explicit weighted prediction of one or more video blocks in the coded unit. Entropy decoding unit 72 may decode a received bitstream and parse the explicit weights from the bitstream. Motion compensation unit 86 of prediction unit 75 applies the explicit weights for bi-directional explicit weighted prediction of one or more bi-directional video blocks in the coded unit. In addition, motion compensation unit 86 of prediction unit 75 applies one or more different weights for uni-directional explicit weighted prediction of one or more uni-directional video blocks in the coded unit.

The explicit weights may comprise bi-directional explicit weights and the one or more different weights may comprise uni-directional explicit weights, which may or may not be received in the coded unit. As noted above, the one or more different weights comprise one or more default weights. The default weights may be pre-defined at MC unit 86 and not included in the syntax elements of the coded unit, or alternatively, the default weights may be included in the syntax elements of the coded unit. Prediction unit 75 may also support decoding according to implicit weighted prediction. For example, decoding unit 70 may receive another coded unit that does not include explicit weights. Following entropy decoding by unit 72, MC unit 86 of prediction unit 75 may generate and apply one or more implicit weights for implicit weighted prediction of one or more video blocks in the another coded unit.

In general, entropy decoding unit 72 receives an encoded bitsteam and entropy decodes the bitstream to generate quantized coefficients, motion information and other syntax elements used according to this disclosure. The motion information (e.g., motion vectors) and other syntax elements are forwarded to prediction unit 75 for use in generating the predictive data. Prediction unit 75 performs uni-directional prediction and bi-directional prediction consistent with this disclosure, applying different weights for uni-directional prediction and bi-directional prediction according to the received syntax elements. The syntax elements may identify the type of weighted prediction to be used, the weights to apply in different scenarios, offset to be applied if explicit weighted prediction is used, and indications of whether rounding adjustments should be used in the decoding.

The quantized coefficients are sent from entropy decoding unit 72 to inverse quantization unit 76, which performs inverse quantization. Inverse transform unit 78 then inverse transforms the de-quantized coefficients back to the pixel domain to generate a residual block. Adder 79 combines the prediction data (e.g., a prediction block) generated by prediction unit 75 with the residual block from inverse transform unit 78 to create a reconstructed video block, which may be stored in memory 74 and/or output from video decoder 70 as decoded video output.

Figure 5:
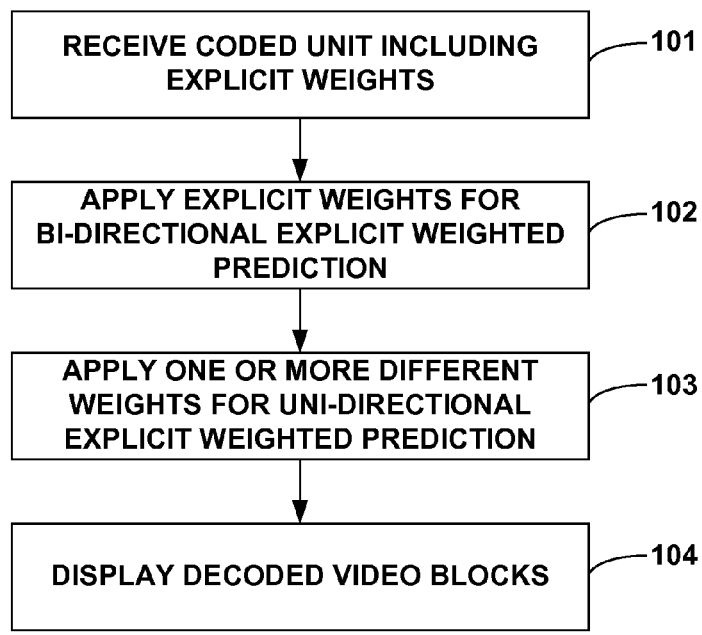
FIGS. 5 and 6 are flow diagrams illustrating exemplary processes that may be performed by a video decoder consistent with this disclosure.

FIG. 5 is a flow diagram illustrating an exemplary process performed by a video decoder consistent with this disclosure. FIG. 5 will be described from the perspective of video decoder 70 of FIG. 4. As shown in FIG. 5, entropy decoding unit 72 receives a coded unit that includes explicit weights (101). Entropy decoding unit 72 may entropy decode the coded unit, e.g., a frame or slice, and parse the explicit weights from the bitstream. Motion compensation unit 86 of prediction unit 75 applies the explicit weights for bi-directional explicit weighted prediction of one or more bi-directional video blocks in the coded unit (102). In addition, motion compensation unit 86 of prediction unit 75 applies one or more different weights via the video decoder for uni-directional explicit weighted prediction of one or more uni-directional video blocks in the coded unit (103). Video decoder 70 may output decoded video blocks to a display (not shown in FIG. 5), which displays the decoded video blocks (104).

Figure 6:
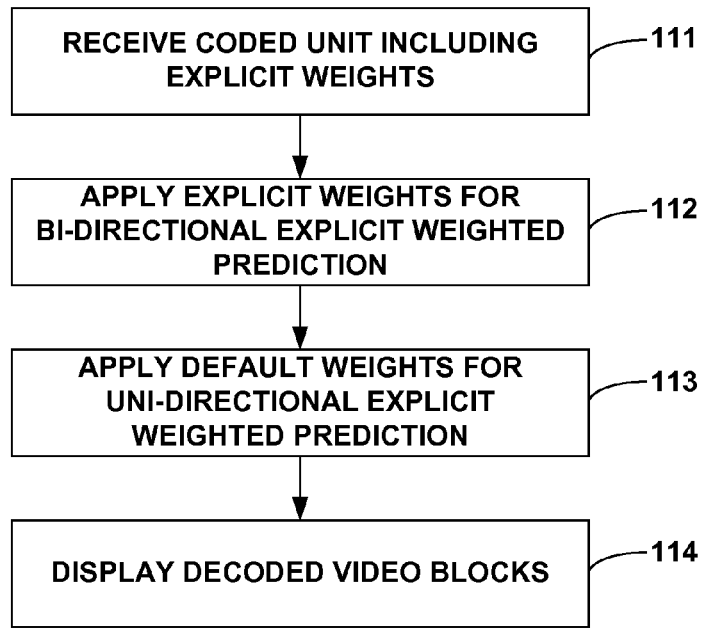

FIG. 6 is another flow diagram illustrating an exemplary process performed by a video decoder consistent with this disclosure. FIG. 6 will also be described from the perspective of video decoder 70 of FIG. 4. As shown in FIG. 6, entropy decoding unit 72 receives a coded unit that includes explicit weights (111). Entropy decoding unit 72 may entropy decode the code unit and parse the explicit weights from the bitstream. Motion compensation unit 86 of prediction unit 75 applies the explicit weights for bi-directional explicit weighted prediction of one or more bi-directional video blocks in the coded unit (112). In addition, motion compensation unit 86 of prediction unit 75 applies one or more default weights for uni-directional explicit weighted prediction of one or more uni-directional video blocks in the coded unit (113). The default weights may also be included in the syntax elements of the coded unit, in which case entropy decoding unit 72 may parse the syntax elements and forward the default weights to prediction unit 75. Alternatively, the default weights may be excluded from the syntax and pre-programmed into MC unit 86 to be applied for explicit uni-directional prediction. Video decoder 70 may output decoded video blocks to a display (not shown in FIG. 5), which displays the decoded video blocks (114).

Figure 7:
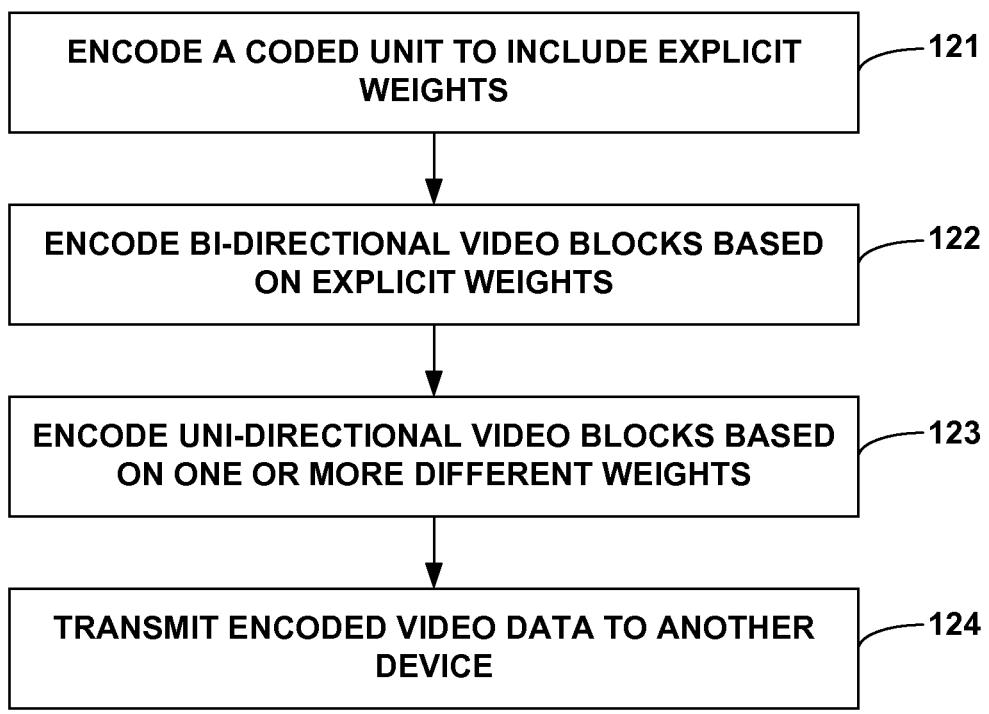
FIG. 7 is a flow diagram illustrating an exemplary process that may be performed by a video encoder consistent with this disclosure.

FIG. 7 is a flow diagram illustrating an exemplary process performed by a video encoder to encode a coded unit (such as a B-frame or B-slice) consistent with this disclosure. FIG. 7 will be described from the perspective of video encoder 50 of FIG. 2. As shown in FIG. 7, motion compensation unit 35 of prediction unit 31 encodes bidirectional video blocks of a coded unit based on explicit weights (121). For example, motion compensation unit 35 may perform a rate-distortion analysis on B-video blocks of the coded unit to select bi-directional weights that minimize a rate-distortion cost metric associated with coding the B-video blocks.

Motion compensation unit 35 of prediction unit 31 also encodes uni-directional video blocks of the coded unit based on different weights (122). For example, motion compensation unit 35 may perform encode P-video blocks of the coded unit based on default weights. In this case, the explicit weights applied for B-video blocks are not used for the P-video blocks. Instead, the P-video blocks are encoded by applying different weights to the predictive data (such as default weights). The explicit weights used in encoding the B-video blocks (and possibly the other weights used in encoding P-video blocks) may be forwarded from prediction unit 31 to entropy coding unit 46. Encoded video blocks (e.g., residual blocks for the P- and B-video blocks) output from adder 48 may be transformed by unit 38 and quantized by unit 40 before being sent to entropy coding unit 46.

Entropy coding unit 46 encodes the weights into syntax elements of the coded unit (123). In particular, entropy coding unit 46 may entropy encode the quantized and transformed coefficients of the video blocks, and may encode the weights used in such encoding within syntax elements of the coded unit. In this case, the explicit weights applied for B-video blocks are encoded into the coded unit for application by a video decoder. The other weights applied for P-video blocks may included (e.g., encoded) or possibly excluded from the bitstream. For example, default weights applied for P-video blocks may included with the explicit weights for application to P-video blocks (e.g., the default weights may be encoded as explicit uni-directional weights), or alternatively, the default weights applied for P-video blocks may excluded from the coded unit and known at the decoder so that such weights do not need to be sent in the bitstream.

After this encoding, the coded unit may be sent from entropy coding unit 46 to a transmitter (e.g., transmitter 24 of FIG. 1). Transmitter 24 can then transmit the encoded video data to another device (124) using wireless communication techniques or another method of data communication.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various embodiments of the invention have been described. These and other embodiments are within the scope of the following claims.

The invention claimed is:

1. A method of decoding video data in a video decoder, the method comprising:
receiving a bi-directional coded unit at the video decoder, wherein the coded unit comprises a slice having bi-directional video blocks and uni-directional video blocks, and wherein the coded unit includes syntax elements indicating at least explicit weights to be applied during explicit weighted prediction of the bi-directional video blocks in the coded unit;
applying the explicit weights via the video decoder for bi-directional explicit weighted prediction of one or more of the bi-directional video blocks in the coded unit, wherein the application of the explicit weights is based on a first list of reference data weighted by a first weighting factor (w2) and based on a second list of reference data weighted by a second weighting factor (w3); and
applying one or more different weights via the video decoder for uni-directional weighted prediction of one or more of the uni-directional video blocks in the coded unit, wherein the application of the one or more different weights is based on the first list of reference data or the second list of reference data weighted by a third weighting factor (w0 or w1), and wherein the third weighting factor (w0 or w1) for the uni-directional video blocks is different from both the first weighting factor (w2) and the second weighting factor (w3) for the bi-directional video blocks within the bi-directional coded unit.

2. The method of claim 1, wherein the explicit weights comprise bi-directional explicit weights and the one or more different weights comprise uni-directional explicit weights, the method further comprising:
receiving the uni-directional explicit weights in the coded unit.

3. The method of claim 1, wherein the one or more different weights comprise one or more default weights.

4. The method of claim 3, wherein the default weights are defined at the video decoder and are not included in the syntax elements of the coded unit.

5. The method of claim 3, wherein the default weights are included in the syntax elements of the coded unit.

6. The method of claim 1, further comprising:
receiving another coded unit that does not include explicit weights; and generating and applying one or more implicit weights for implicit weighted prediction of one or more video blocks in a slice of the another coded unit.

7. The method of claim 1, further comprising adding a picture offset for a respective list of reference data to at least one of the weighted predictions and performing a shift right operation, wherein the picture offset is added before the right shift operation is performed.

8. A method of encoding video data in a video encoder, the method comprising:
encoding a bi-directional coded unit at the video encoder, wherein the coded unit comprises a slice having bi-directional video blocks and uni-directional video blocks, and wherein the coded unit includes syntax elements indicating at least explicit weights to be applied during explicit weighted prediction of the bi-directional video blocks in the coded unit;
encoding via the video encoder one or more of the bi-directional video blocks in the coded unit based on the explicit weights by having a first list of reference data weighted by a first weighting factor (w2) and on a second list of reference data weighted by a second weighting factor (w3); and
encoding via the video encoder one or more of the uni-directional video blocks in the coded unit based on one or more different weights by having the first list of reference data or the second list of reference data weighted by a third weighting factor (w0 or w1), wherein the third weighting factor (w0 or w1) for the uni-directional video blocks is different from both the first weighting factor (w2) and the second weighting factor (w3) for the bi-directional video blocks within the bi-directional coded unit.

9. The method of claim 8, wherein the explicit weights comprise bi-directional explicit weights, wherein the one or more different weights comprise uni-directional explicit weights, and wherein the syntax elements include the uni-directional explicit weights.

10. The method of claim 8, wherein the explicit weights comprise bi-directional explicit weights, wherein the one or more different weights comprise default weights, and wherein the syntax elements include the default weights.

11. The method of claim 8, wherein the explicit weights comprise bi-directional explicit weights, wherein the one or more different weights comprise default weights, and wherein the syntax elements do not include the default weights.

12. The method of claim 8, further comprising adding a picture offset for a respective list of reference data to at least one of the weighted predictions and performing a shift right operation, wherein the picture offset is added before the right shift operation is performed.

13. A video decoding apparatus comprising:
an entropy decoding unit that receives a bi-directional coded unit, wherein the coded unit comprises a slice having bi-directional video blocks and uni-directional video blocks, and entropy decodes one or more syntax elements of the coded unit, wherein the syntax elements indicate at least explicit weights to be applied during explicit weighted prediction of the bi-directional video blocks in the coded unit; and
a prediction unit that applies the explicit weights for bi-directional explicit weighted prediction of one or more of the bi-directional video blocks in the coded unit, wherein the application of the explicit weights is based on a first list of reference data weighted by a first weighting factor (w2) and based on a second list of reference data weighted by a second weighting factor (w3), and the prediction unit further applies one or more different weights for uni-directional weighted prediction of one or more of the uni-directional video blocks in the coded unit, wherein the application of the one or more different weights is based on the first list of reference data or the second list of reference data weighted by a third weighting factor (w0 or w1), and wherein the third weighting factor (w0 or w1) for the uni-directional video blocks is different from both the first weighting factor (w2) and the second weighting factors (w3) for the bi-directional video blocks within the bi-directional coded unit.

14. The video decoding apparatus of claim 13, wherein the explicit weights comprise bi-directional explicit weights and the one or more different weights comprise uni-directional explicit weights, and wherein the syntax elements include the uni-directional explicit weights.

15. The video decoding apparatus of claim 13, wherein the one or more different weights comprise one or more default weights.

16. The video decoding apparatus of claim 15, wherein the default weights are defined at the video decoding apparatus and are not included in the syntax elements of the coded unit.

17. The video decoding apparatus of claim 15, wherein the default weights are included in the syntax elements of the coded unit.

18. The video decoding apparatus of claim 13, wherein:
the entropy decoding unit receives and decodes another coded unit that does not include explicit weights; and
the prediction unit generates and applies one or more implicit weights for implicit weighted prediction of one or more video blocks in a slice of the another coded unit.

19. The video decoding apparatus of claim 13, wherein the video decoding apparatus comprises an integrated circuit.

20. The video decoding apparatus of claim 13, wherein the video decoding apparatus comprises a microprocessor.

21. The video decoding apparatus of claim 13, wherein the video decoding apparatus comprises a wireless communication device that includes a video decoder.

22. The video decoding apparatus of claim 13, wherein the prediction unit adds a picture offset for a respective list of reference data to at least one of the weighted predictions and performs a shift right operation, wherein the picture offset is added before the right shift operation is performed.

23. A video encoding apparatus that encodes video data, the apparatus comprising:
a memory that stores the video data and two or more lists of data used to predictively encode the video data; and
a prediction unit that:
encodes a bi-directional coded unit, wherein the coded unit comprises a slice having bi-directional video blocks and uni-directional video blocks, and wherein the coded unit includes syntax elements indicating at least explicit weights to be applied during explicit weighted prediction of the bi-directional video blocks in the coded unit;
encodes one or more of the bi-directional video blocks in the coded unit based on the explicit weights by having a first list of reference data weighted by a first weighting factor (w2) and a second list of reference data weighted by a second weighting factor (w3); and
encodes one or more of the uni-directional video blocks in the coded unit based on one or more different weights by having the first list of reference data or the second list of reference data weighted by a third weighting factor (w0 or w1), wherein the third weighting factor (w0 or w1) for the uni-directional video blocks is different from both the first weighting factor (w2) and the second weighting factor (w3) for the bi-directional video blocks within the bi-directional coded unit.

24. The video encoding apparatus of claim 23, wherein the explicit weights comprise bi-directional explicit weights, wherein the one or more different weights comprise uni-directional explicit weights, and wherein the syntax elements include the uni-directional explicit weights.

25. The video encoding apparatus of claim 23, wherein the explicit weights comprise bi-directional explicit weights, wherein the one or more different weights comprise default weights, and wherein the syntax elements include the default weights.

26. The video encoding apparatus of claim 23, wherein the explicit weights comprise bi-directional explicit weights, wherein the one or more different weights comprise default weights, and wherein the syntax elements do not include the default weights.

27. The video encoding apparatus of claim 23, wherein the video encoding apparatus comprises an integrated circuit.

28. The video encoding apparatus of claim 23, wherein the video encoding apparatus comprises a microprocessor.

29. The video encoding apparatus of claim 23, wherein the video encoding apparatus comprises a wireless communication device that includes a video encoder.

30. The video encoding apparatus of claim 23, wherein the prediction unit adds a picture offset for a respective list of reference data to at least one of the weighted predictions and performs a shift right operation, wherein the picture offset is added before the right shift operation is performed.

31. A device that decodes video data, the device comprising:
    means for receiving a bi-directional coded unit, wherein the coded unit comprises a slice having bi-directional video blocks and unidirectional video blocks, and wherein the coded unit includes syntax elements indicating at least explicit weights to be applied during explicit weighted prediction of the bi-directional video blocks in the coded unit;
    means for applying the explicit weights for bi-directional explicit weighted prediction of one or more of the bi-directional video blocks in the coded unit, wherein the application of the explicit weights is based on a first list of reference data weighted by a first weighting factor (w2) and based on a second list of reference data weighted by a second weighting factor (w3); and
    means for applying one or more different weights for the uni-directional weighted prediction of one or more of the uni-directional video blocks in the coded unit, wherein the application of the one or more different weights is based on the first or second list of reference data weighted by a third weighting factor (w0 or w1) for the uni-directional video blocks which is different from both the first weighting factor (w2) and the second weighting factor (w3) for the bi-directional video blocks within the bi-directional coded unit.

32. The device of claim 31, wherein the explicit weights comprise bi-directional explicit weights and the one or more different weights comprise uni-directional explicit weights, the device further comprising:
    means for receiving the uni-directional explicit weights in the coded unit.

33. The device of claim 31, wherein the one or more different weights comprise one or more default weights.

34. The device of claim 33, wherein the default weights are defined at the device and are not included in the syntax elements of the coded unit.

35. The device of claim 33, wherein the default weights are included in the syntax elements of the coded unit.

36. The device of claim 31, further comprising:
    means for receiving another coded unit that does not include explicit weights; and
    means for generating one or more implicit weights; and
    means for applying the one or more implicit weights for implicit weighted prediction of one or more video blocks in a slice of the another coded unit.

37. The device of claim 31, further comprising means for adding a picture offset for a respective list of reference data to at least one of the weighted predictions and means for performing a shift right operation, wherein the picture offset is added before performing the right shift operation.

38. A device that encodes video data, the device comprising:
    means for encoding a bi-directional coded unit, wherein the coded unit comprises a slice having bi-directional video blocks and uni-directional video blocks, and wherein the coded unit includes syntax elements indicating at least explicit weights to be applied during explicit weighted prediction of the bi-directional video blocks in the coded unit;
    means for encoding one or more of the bi-directional video blocks in the coded unit based on the explicit weights by having a first list of reference data weighted by a first weighting factor (w2) and a second list of reference data weighted by a second weighting factor (w3); and
    means for encoding one or more of the uni-directional video blocks in the coded unit based on one or more different weights by having the first or second list of reference data weighted by a third weighting factor (w0 or w1) for the uni-directional video blocks which is different from both the first weighting factor (w2) and the second weighting factors (w3) for the bi-directional video blocks within the bi-directional coded unit.

39. The device of claim 38, wherein the explicit weights comprise bi-directional explicit weights, wherein the one or more different weights comprise uni-directional explicit weights, and wherein the syntax elements include the uni-directional explicit weights.

40. The device of claim 38, wherein the explicit weights comprise bi-directional explicit weights, wherein the one or more different weights comprise default weights, and wherein the syntax elements include the default weights.

41. The device of claim 38, wherein the explicit weights comprise bi-directional explicit weights, wherein the one or more different weights comprise default weights, and wherein the syntax elements do not include the default weights.

42. The device of claim 38, further comprising means for adding a picture offset for a respective list of reference data to at least one of the weighted predictions and means for performing a shift right operation, wherein the picture offset is added before performing the right shift operation.

43. A computer-readable storage medium comprising instructions that when executed cause a processor to decode video data, wherein:
    upon receiving a bi-directional coded unit, wherein the coded unit comprises a slice having bi-directional and uni-directional video blocks, and wherein the coded unit includes syntax elements indicating at least explicit weights to be applied during explicit weighted prediction of the uni-directional video blocks in the coded unit, the instructions cause the processor to:
apply the explicit weights for bi-directional explicit weighted prediction of one or more of the bi-directional video blocks in the coded unit, wherein the application of the explicit weights is based on a first list of reference data weighted by a first weighting factor (w2) and based on a second list of reference data weighted by a second weighting factor (w3); and
apply one or more different weights for uni-directional weighted prediction of one or more of the uni-directional video blocks in the coded unit, wherein the application of the one or more different weights is based on the first list of reference data or the second list of reference data weighted by a third weighting factor (w0 or w1), and wherein the third weighting factor (w0 or w1) for the uni-directional video blocks is different from both the first weighting factor (w2) and second weighting factors (w3) for the bi-directional video blocks within the bi-directional coded unit.

44. The computer-readable storage medium of claim 43, wherein the explicit weights comprise bi-directional explicit weights and the one or more different weights comprise uni-directional explicit weights received in the coded unit.

45. The computer-readable storage medium of claim 43, wherein the one or more different weights comprise one or more default weights.

46. The computer-readable storage medium of claim 45, wherein the default weights are pre-defined and not included in the syntax elements of the coded unit.

47. The computer-readable storage medium of claim 45, wherein the default weights are included in the syntax elements of the coded unit.

48. The computer-readable storage medium of claim 43, further comprising instructions that cause the processor to:
upon receiving another coded unit that does not include explicit weights,
generate and apply one or more implicit weights for implicit weighted prediction of one or more video blocks in a slice of the another coded unit.

49. The computer-readable storage medium of claim 43, wherein the instructions further cause the processor to add a picture offset for a respective list of reference data to at least one of the weighted predictions and perform a shift right operation, wherein the picture offset is added before performing the right shift operation.

50. A computer-readable storage medium comprising instructions that when executed cause a processor to encode video data, wherein the instructions cause the processor to:
encode a bi-directional coded unit that wherein the coded unit comprises a slice having bi-directional video blocks and uni-directional video blocks, and wherein the coded unit includes syntax elements indicating explicit weights to be applied during explicit weighted prediction of the bi-directional video blocks in the coded unit;
encode one or more of the bi-directional video blocks in the coded unit based on the explicit weights by having a first list of reference data weighted by a first weighting factor (w2) and a second list of reference data weighted by a second weighting factor (w3); and
encode one or more of the uni-directional video blocks in the coded unit based on one or more different weights by having the first list of reference data or the second list of reference data weighted by a third a weighting factor (w0 or w1), wherein the third weighting factor (w0 or w1) for the uni-directional video blocks is different from both the first weighting factor (w2) and the second weighting factors (w3) for the bi-directional video blocks within the bi-directional coded unit.

51. The computer-readable storage medium of claim 50, wherein the explicit weights comprise bi-directional explicit weights, wherein the one or more different weights comprise uni-directional explicit weights, and wherein the syntax elements include the uni-directional explicit weights.

52. The computer-readable storage medium of claim 50, wherein the explicit weights comprise bi-directional explicit weights, wherein the one or more different weights comprise default weights, and wherein the syntax elements include the default weights.

53. The computer-readable storage medium of claim 50, wherein the explicit weights comprise bi-directional explicit weights, wherein the one or more different weights comprise default weights, and wherein the syntax elements do not include the default weights.

54. The computer-readable storage medium of claim 51, wherein the instructions further cause the processor to add a picture offset for a respective list of reference data to at least one of the weighted predictions and perform a shift right operation, wherein the picture offset is added before performing the right shift.

* * * * *